United States Patent [19]

Katoh et al.

[11] Patent Number: 4,897,204

[45] Date of Patent: Jan. 30, 1990

[54] PROCESS AND APPARATUS FOR GAS DISSOLUTION

[75] Inventors: Yoshihisa Katoh, Toyota; Takashi Ogawa, Kariya; Masashi Fujimoto, Toyoake; Mitsumasa Hasegawa, Kariya, all of Japan

[73] Assignee: Toshiba Ceramics Co., Ltd., Tokyo, Japan

[21] Appl. No.: 246,779

[22] Filed: Sep. 20, 1988

[30] Foreign Application Priority Data

Oct. 1, 1987 [JP] Japan .................................. 62-248956

[51] Int. Cl.$^4$ ................................................ C02F 1/72
[52] U.S. Cl. ........................................... 210/758; 55/53;
55/196; 210/765; 210/220; 261/122; 261/DIG. 75
[58] Field of Search ............... 210/169, 220, 620, 621, 210/627, 629, 758, 765; 261/DIG. 75, 122; 55/53, 196, 16, 158

[56] References Cited

U.S. PATENT DOCUMENTS

| 4,229,389 | 10/1980 | Granger | 261/122 |
| 4,301,007 | 11/1981 | Savand et al. | 210/220 X |
| 4,629,591 | 12/1986 | Forsyth | 261/122 |

FOREIGN PATENT DOCUMENTS 0694918  7/1953  United Kingdom ....... 261/DIG. 75

Primary Examiner—Charles Hart
Attorney, Agent, or Firm—Foley & Lardner, Schwartz, Jeffery, Schwaab, Mack, Blumenthal & Evans

[57] ABSTRACT

A process for gas dissolution which uses a vessel, a portion wall made of ceramic material for dividing the vessel into a first chamber and a second chamber, a first inlet of the vessel for introducing a liquid into the first chamber, a second inlet of the vessel for introducing a pressurized gas into the second chamber, and a discharge port of the vessel for discharging the liquid from the first chamber.

13 Claims, 2 Drawing Sheets

PROCESS AND APPARATUS FOR GAS DISSOLUTION

BACKGROUND OF THE INVENTION

This invention relates to a process and apparatus for gas dissolution which is adapted to dissolve a gas into a liquid.

Water in which a great deal of oxygen is dissolved is used to cultivate fish or shellfish. Such water is also used to refresh, clean and preserve vegetables. The prior art methods of dissolving oxygen into water comprises a method of blowing air into water and a method of spraying water into the air.

However, the prior art methods are unsatisfactory, since the oxygen dissolving speed is slow.

SUMMARY OF THE INVENTION

Therefore, one main object of this invention is to provide a process for gas dissolution which is capable of accelerating the speed of dissolving gas into a liquid.

It is also an object of the present invention to provide an apparatus for carrying out the process of the invention.

According to one aspect of this invention, there is provided a process for gas dissolution which includes steps of introducing liquid into a first chamber of a vessel, setting the pressure of gas to be dissolved higher than that of the liquid, introducing the pressurized gas into a second chamber of the vessel, making the gas penetrate a partition wall made of a porous ceramic material into the liquid and discharging the liquid from the first chamber of the vessel.

According to one aspect of this invention, there is provided an apparatus for gas dissolution which includes a vessel, a partition wall for dividing the vessel into a first chamber and a second chamber, a first inlet of the vessel for introducing a liquid such as a pressurized water into the first chamber, a second inlet of the vessel for introducing a pressurized gas such as an oxygen gas into the second chamber, and a discharge port of the vessel for discharging the liquid from the first chamber. The pressure of the pressurized gas in the vessel is higher than that of the liquid in the vessel. The partition wall is made of a porous ceramic material so that the gas leaking from the second chamber into the first chamber through the partition wall can become fine bubbles in the liquid.

This invention makes it possible to facilitate the dissolution of the gas into the liquid in the first chamber. Since the partition wall is made of a porous ceramic material, the gas bubbles which leak out from the second chamber through the partition wall into the first chamber are very fine.

Preferably, the diameter of each pore in the ceramic material which faces the first chamber is about 0.8 micron or less.

Examples of the porous ceramic material are high pure alumina, zirconia, silicon carbide, silicon nitride and the like, which are all excellent in corrosion resisting capacity.

If such ceramics are used, it becomes possible to use acid or alkaline liquid or gas. The process according to this invention can be used for the manufacture of acid or alkaline liquid which is used for chemical reaction of acid or alkaline liquid and gas. In addition, the temperature of liquids or gases can be set individually and arbitrarily.

A partition wall is preferably formed in a multi-layer construction, in which the pore size is increased from the first layer which faces the first chamber to the last layer which faces the second chamber. More preferably, the thickness of the first layer which faces the first chamber ranges from about 5 micron to 40 micron for gas dissolution efficiency, and the diameter of each pore of the first layer is about 0.8 micron or less.

A polygon column (preferably a hexagon column) may be used as a partition wall for easy setting, according to this invention. A plurality of throughholes (preferably through-holes with circular-shaped cross-section) may be provided in the polygon column in its longitudinal direction to enlarge the surface area inside of the partition wall.

The pressure of the gas may be preferably about two times higher than the pressure of the liquid.

The pressure of the liquid is preferably from about 0.1 to 5 $kg/cm^2$ gauge pressure. Especially, about 1 $kg/cm^2$ gauge pressure is preferable.

The liquid may be preferably one of the fluids selected from the group of fresh water, brine and waste water.

The gas may be preferably selected from the group of oxygen, air and a mixed gas of oxygen and air.

If the partition wall has a pore size of 0.8 micron, the pressure of the gas should be about 2 $kg/cm^2$ gauge pressure or more to dissolve the gas into water because of the angle of contact. A partition wall made of a high-polymer membrane will be damaged at that pressure.

BRIEF DESCRIPTION OF THE DRAWINGS

By way of example and to make the description more complete, reference is made to the accompanying drawings in which.

DETAILED DESCRIPTION OF THE PREFERRED EMBODIMENTS

Figure 1:
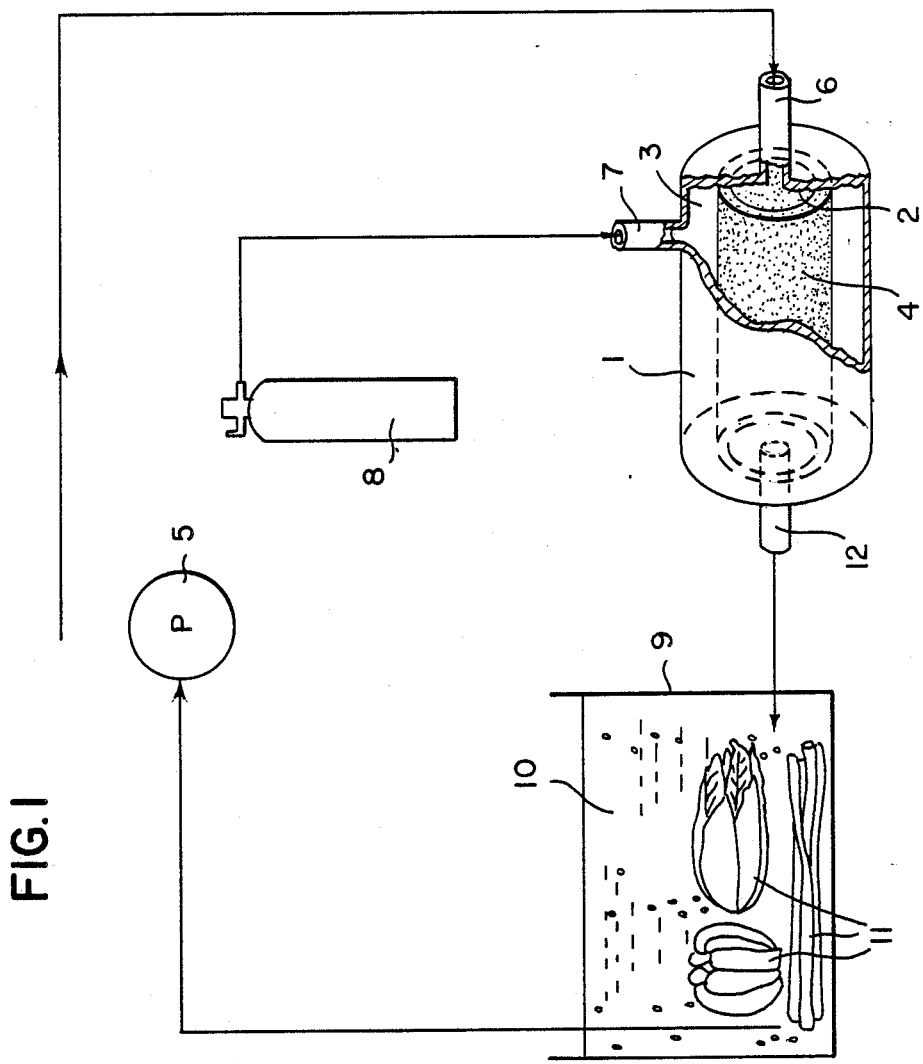
FIG. 1 is a partial perspective view showing a process and apparatus according to one preferred embodiment of this invention.

In FIG. 1, a vessel 1 is made of stainless steel (SUS) and is cylindrically-shaped with both ends closed. In the vessel 1 is installed a ringshaped partition wall 4 which is adapted to divide the interior of the vessel 1 into a first chamber 2 and a second chamber 3. The partition wall 4 is made of a high purity porous ceramic material, as above stated. At one end of the vessel 1 is installed a tube-shaped inlet means 6 which is adapted to introduce pressurized water into the first chamber 2. The pressurized water is supplied from a water tank 9 into the first chamber 2 by means of a pump 5. The water tank 9 is a polyethylene vessel. At a peripheral side portion of the vessel 1 is installed a tube-shaped inlet means 7 which is adapted to introduce pressurized oxygen gas into the second chamber 3. The pressurized oxygen gas is supplied from an oxygen cylinder-shaped tank 8.

The partition wall 4 has a three-layer construction. The diameter of each pore of the first layer facing the first chamber 2 is about 0.8 micron. The thickness of the three layers of the partition wall 4 is 3 mm. The thickness of the first layer of the partition wall 4 is about 20 microns. In addition, the hydraulic pressure and flow rate of water in the inlet means 6 are predetermined so that they are, e.g., 1 kg/cm$^2$ gauge pressure and 40 l/min, respectively. The pressure and the flow rate of the oxygen gas in the inlet means 7 are predetermined so that they are, e.g., 2 kg/cm$^2$ gauge pressure and 10 l/min, respectively. With this arrangement, the oxygen gas inside the second chamber 3 leaks out as extremely fine bubbles into the first chamber 2 through the partition wall 4. As a result, the water inside the first chamber 2 increases in its concentration of oxygen. The oxygen is partially contained as bubbles in the water in the first chamber 2.

In the other end of the vessel 1 is installed a tube-shaped discharge port means 12 which is adapted to discharge the oxygen-containing water from the first chamber 2 outside the vessel 1. The oxygen-contained water is introduced into the water 10 which is contained in the water tank 9.

EXAMPLES

Example 1

In FIG. 1, oxygen-containing water in the first chamber 2 was introduced into the water tank 9 through the discharge port means 12. The water tank 9 has volume of 100 l and is capable of containing from 70≈80 l of water. The water tank 9 is placed in a refrigerator (not illustrated) so that the temperature of the water 10 ranges from 1 to 4° C. A fresh vegetable or vegetables 11 are submerged in the water 10. The water 10 is pumped by the pump 5 so as to be introduced by way of a pipe or tube into the first chamber 2, once again through the inlet means 6. In other words, the water was recycled.

The water absorption coefficient of the vegetables was compared using an example of this invention n which the oxygen dissolution was carried out for five hours by using the apparatus of FIG. 1 and a comparative example in which the oxygen-containing water was not introduced at all into the water 10. In case of a Chinese cabbage (nappa vegetable), the water absorption coefficient was 5.5% in the comparative example, while it was 50% in the example of this invention. In case of lettuce, the water absorption coefficient was 6.2% in the comparative example, while it was 49% in the example of this invention. Likewise, in the case of spinach, it was 7.3% in the comparative example, while it was 38% in the example of this invention. In case of a Welsh onion, it was 4.6% in the comparative example, while it was 35% in the example of this invention.

In the foregoing description, the coefficient of water absorption stands for the percentage between the weight of a vegetable before it is submerged in the water tank and the weight of the vegetable which has been submerged for the specified number of hours in the water tank.

Example 2

Attempts were made to use 400 cc of natural water in a small river. Some killifish were grown in the water while oxygen was dissolved into the water by means of this invention.

The growth situation of killifish was compared using an example of this invention in which oxygen gas was dissolved into the water and a comparative example in which the same water taken from the small river was subjected to continuous aeration by means of an aeration unit for aquarium fish, so as to supply the air into the water in the well-known manner. Ten killifish could survive on the first day both in the comparative example and the example of this invention. On the second day, however, eight killifish could survive in the comparative example while ten killifish could survive in the example of this invention. On the fourth day and the eighth day, only seven killifish could survive in the comparative example while ten killifish could still survive in the example of this invention.

Figure 2:
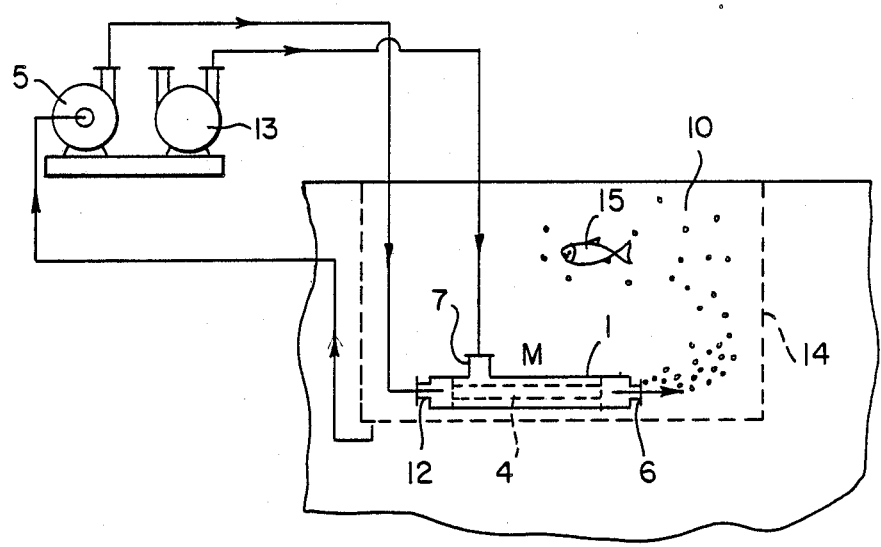
FIG. 2 is a schematic view showing a process and apparatus according to a second embodiment of this invention.

FIG. 2 shows a further embodiment of the present invention in which Example 2 can be carried out. In FIG. 2, the same reference numerals designate the same or corresponding elements as in the embodiment of FIG. 1. Therefore, such elements will not be explained, and only new elements will be described in detail. An air compressor 13 is installed in place of the oxygen cylinder means 8. The vessel 9 is replaced by a wire net 14 which is submerged in the water. A fish 15 is placed in the water surrounded by the wire net 14. The vessel 1 is also placed in this section.

Example 3

180 l of city water was poured into a drum and cooled to the temperature of 1° to 4° C. Then, oxygen was forced to dissolve in the water by means of this invention.

Figure 3:
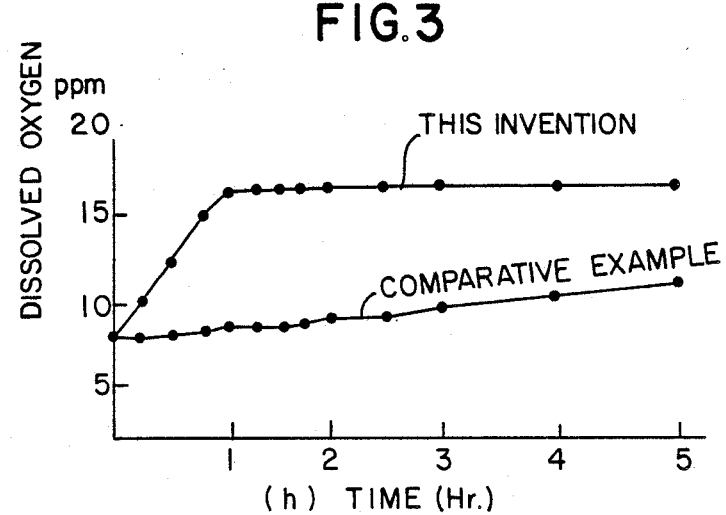
FIG. 3 is a graph showing the effects of a process according to a third embodiment of this invention.

The time change in the concentration of dissolved oxygen was compared between an example of this invention in which oxygen was dissolved in the city water in the drum and a comparative example in which 10 l/min of pressured air is injected into the city water in the drum. The outcome is illustrated in FIG. 3. As shown in FIG. 3, the concentration of the dissolved oxygen rises rapidly from 8 ppm in the initial stage up to 16 ppm, which is the steady-state value, after the lapse of one hour in the example of this invention. However, in the comparative example, the concentration of the dissolved oxygen is slightly increased from 8 ppm in the initial stage up to 12 ppm in five hours in a uniform manner.

According to the present invention, as can be seen from the foregoing, a gas such as oxygen in the second chamber can be advantageously dissolved into a liquid in the first chamber by way of a partition wall that is made of a porous ceramic material, such that the bubbles exposed in the first chamber from the second chamber through the partition wall can be very fine.

What is claimed is:

1. A process for gas dissolution, comprising the steps of:
   introducing liquid into a first chamber of a vessel;
   setting the pressure of gas to be dissolved about two times higher than that of the liquid;
   introducing the pressurized gas into a second chamber of the vessel;
   making the gas penetrate a partition wall into the liquid, wherein the partition wall comprises a plurality of layers of a porous ceramic material, the first ceramic layer facing the first chamber and having a thickness of about 5 to 40 μm and the diameter of each pore of the first ceramic layer being about 0.8 μm or less; and
   discharging the liquid from the first chamber of the vessel.

2. A process for gas dissolution as defined in claim 1, wherein the liquid flowing through the discharge port means contains the bubbles which are not partially dissolved after they are led from the second chamber into the first chamber through the partition wall.

3. A process for gas dissolution as defined in claim 1, wherein the liquid is a pressurized liquid.

4. A process for gas dissolution as defined in claim 3, wherein the pressure of the liquid ranges from about 0.1 to 5 kg/cm$^2$ gauge pressure.

5. A process for gas dissolution as defined in claim 3, wherein the pressure of the liquid is about 1 kg/cm$^2$ gauge pressure.

6. A process for gas dissolution as defined in claim 1, wherein the liquid comprises one selected from a group of fresh water, brine and waste water.

7. A process for gas dissolution as defined in claim 1, wherein the gas comprises one selected from a group of oxygen gas, air, and mixed gas of oxygen as and air.

8. A process for gas dissolution as defined in claim 1, wherein the liquid is a pressurized water and the gas is a pressurized oxygen gas.

9. A process as claimed in claim 1, wherein the pore size of each of the plurality of ceramic layers of the partition wall increases from the first layer facing the first chamber to the last layer facing the second chamber.

10. An apparatus for gas dissolution, which comprises:
a vessel having an interior space;
partition wall means for dividing the interior space of the vessel into a first chamber and a second chamber;
a first inlet means to the vessel for introducing a liquid into the first chamber;
a second inlet means to the vessel for introducing a pressurized gas into the second chamber;
a discharge port means to the vessel for discharging the liquid from the first chamber; and
means for setting the pressure of the pressurized gas in the vessel higher than that of the liquid in the vessel,
wherein said partition wall means comprises a plurality of layers of a porous ceramic material, the first ceramic layer facing the first chamber and having a thickness of about 5 to 40 $\mu$m and the diameter of each pore of the first ceramic layer being about 0.8 $\mu$m or less, whereby gas leaking from the second chamber into the first chamber through the partition wall can become fine bubbles in the liquid.

11. A apparatus for gas dissolution as defined in claim 10, wherein the first inlet means is placed at one end of the vessel, and the discharge port means is placed at the other end of the vessel.

12. An apparatus for gas dissolution as defined in claim 10, wherein the partition wall is formed in the shape of tube, and the first chamber is positioned inside the partition wall, and the second chamber is positioned outside the partition wall.

13. An apparatus as claimed in claim 10, wherein the pore size of each of the plurality of ceramic layers of the partition wall increases from the first layer facing the first chamber to the last layer facing the second chamber.

* * * * *